United States Patent
Inada et al.

(10) Patent No.: US 11,906,060 B2
(45) Date of Patent: Feb. 20, 2024

(54) ROTARY COMPRESSOR WITH BACKFLOW SUPPRESION MECHANISM FOR AN INTRODUCTION PATH

(71) Applicant: DAIKIN INDUSTRIES, LTD., Osaka (JP)

(72) Inventors: Yukihiro Inada, Osaka (JP); Daiki Kikutake, Osaka (JP); Yuuya Sunahara, Osaka (JP); Yuuya Sawada, Osaka (JP); Chihiro Endou, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 17/682,572

(22) Filed: Feb. 28, 2022

(65) Prior Publication Data
US 2022/0178372 A1 Jun. 9, 2022

Related U.S. Application Data

(63) Continuation of application No. PCT/JP2020/024903, filed on Jun. 24, 2020.

(30) Foreign Application Priority Data

Aug. 30, 2019 (JP) .................. 2019-158623

(51) Int. Cl.
*F16K 15/08* (2006.01)
*F04C 29/12* (2006.01)
(Continued)

(52) U.S. Cl.
CPC ............ *F16K 15/08* (2013.01); *F04C 18/322* (2013.01); *F04C 29/0007* (2013.01); *F04C 29/042* (2013.01); *F04C 29/126* (2013.01)

(58) Field of Classification Search
CPC .... F16K 15/08; F04C 18/322; F04C 29/0007; F04C 29/042; F04C 29/126
See application file for complete search history.

(56) References Cited

U.S. PATENT DOCUMENTS

| | | | |
|---|---|---|---|
| 6,171,084 B1* | 1/2001 | Wallis | F04C 29/126 418/270 |
| 2017/0138361 A1 | 5/2017 | Mizushima et al. | |
| 2019/0277292 A1 | 9/2019 | Inada et al. | |

FOREIGN PATENT DOCUMENTS

| | | |
|---|---|---|
| CN | 106536938 A | 3/2017 |
| EP | 3 263 897 A1 | 1/2018 |

(Continued)

OTHER PUBLICATIONS

WIPO Publication WO 2016/113785A1 with machine translation, Inventor: Nakai el al, Title: Refrigeration Cycle Device and Compressor Used in Same, Published on Jul. 21, 2016. (Year: 2016).*

(Continued)

*Primary Examiner* — Mary Davis
(74) *Attorney, Agent, or Firm* — Global IP Counselors, LLP

(57) ABSTRACT

A rotary compressor includes a drive mechanism, a compression mechanism, an introduction path to introduce a fluid into a compression chamber of the compression mechanism, and a backflow suppression mechanism. At least one of a first surface and a second surface of a valve body includes an annular first non-contact region that is formed in a predetermined range extending radially inward from an outer edge of the valve body and that does not come into contact with a corresponding valve seat, an annular second non-contact region that is formed in a predetermined range extending radially outward from the hole of the valve body and that does not come into contact with a corresponding valve seat, and a contact region that is formed between the first non-contact region and the second non-contact region and that comes into contact with a corresponding valve seat.

11 Claims, 12 Drawing Sheets

(51) Int. Cl.
  *F04C 29/00*   (2006.01)
  *F04C 29/04*   (2006.01)
  *F04C 18/32*   (2006.01)

(56) References Cited

FOREIGN PATENT DOCUMENTS

| | | | |
|---|---|---|---|
| EP | 3 168 478 B1 | 5/2019 | |
| EP | 3 511 572 A1 | 7/2019 | |
| GB | 2217814 A * | 11/1989 | ............ F04C 29/126 |
| JP | 51-23132 U | 2/1976 | |
| JP | 56-34199 Y2 | 8/1981 | |
| JP | 2-4287 Y2 | 1/1990 | |
| JP | 2016-11708 A | 1/2016 | |
| JP | 6090248 B2 | 3/2017 | |
| WO | 2016/006565 A1 | 1/2016 | |
| WO | 2018/083944 A1 | 5/2018 | |

OTHER PUBLICATIONS

International Search Report of corresponding PCT Application No. PCT/JP2020/024903 dated Sep. 1, 2020.
International Preliminary Report of corresponding PCT Application No. PCT/JP2020/024903 dated Mar. 10, 2022.
European Search Report of corresponding EP Application No. 20 85 8385.6 dated Sep. 5, 2022.

* cited by examiner

ROTARY COMPRESSOR WITH BACKFLOW SUPPRESION MECHANISM FOR AN INTRODUCTION PATH

CROSS-REFERENCE TO RELATED APPLICATIONS

This is a continuation of International Application No. PCT/JP2020/024903 filed on Jun. 24, 2020, which claims priority to Japanese Patent Application No. 2019-158623, filed on Aug. 30, 2019. The entire disclosures of these applications are incorporated by reference herein.

BACKGROUND

Field of Invention

The present disclosure relates to a rotary compressor.

Background Information

A rotary compressor described in Japanese Patent No. 6090248 includes an injection path that introduces a fluid into a compression chamber of the compressor. A check valve is provided in the injection path. In the check valve, a valve main body is disposed between a holding member and a valve seating surface. The valve main body is formed in a circular annular shape in which a hole is formed in a central portion.

The valve main body moves between the holding member and the valve seating surface in accordance with a differential pressure between the internal pressure of the compression chamber and the internal pressure of the injection path. When the internal pressure of the compression chamber becomes lower than the internal pressure of the injection path, the valve main body is separated from the holding member to open a communication path of the valve holding member. At this time, the valve main body is in contact with the valve seating surface. In this state, the fluid is introduced into the compression chamber through the communication path and the hole of the valve main body. When the internal pressure of the compression chamber becomes higher than the internal pressure of the injection path, the valve main body comes into contact with the holding member to close the communication path. Thus, it is possible to suppress a backflow of a refrigerant in the compression chamber through the injection path.

SUMMARY

A first aspect is directed to a rotary compressor including a drive mechanism, a compression mechanism configured to be rotationally driven by the drive mechanism, an introduction path configured to introduce a fluid into a compression chamber of the compression mechanism, and a backflow suppression mechanism configured to suppress a backflow of the fluid in the introduction path. The backflow suppression mechanism includes a first valve receiving portion disposed in the introduction path, a second valve receiving portion disposed on a downstream side of the first valve receiving portion in the introduction path, and a valve body disposed between the first valve receiving portion and the second valve receiving portion. The first valve receiving portion partitions the introduction path into an inflow-side flow path and an outflow-side flow path. The first valve receiving portion has a communication path that allows the two flow paths to communicate with each other and a first valve seat facing a first surface of the valve body. The second valve receiving portion has a second valve seat facing a second surface of the valve body. The valve body has a pressure receiving portion on which a pressure of the compression chamber acts. The backflow suppression mechanism being is configured to reciprocate, in accordance with a change in the pressure of the compression chamber, between a first position at which the valve body is in contact with the first valve seat and closes the communication path, and a second position at which the valve body is in contact with the second valve seat and opens the communication path. At least one hole is formed in the valve body. The fluid supplied to the compression chamber when the valve body is at the second position passes through the at least one through hole. At least one of the first surface and the second surface of the valve body includes an annular first non-contact region that is formed in a predetermined range extending radially inward from an outer edge of the valve body and that does not come into contact with a corresponding valve seat, an annular second non-contact region that is formed in a predetermined range extending radially outward from the hole of the valve body and that does not come into contact with a corresponding valve seat, and a contact region that is formed between the first non-contact region and the second non-contact region and that comes into contact with a corresponding valve seat.

DETAILED DESCRIPTION OF EMBODIMENT(S)

Hereinafter, an embodiment of the present disclosure will be described with reference to the drawings. Note that the following embodiment is a substantially preferable example, and is not intended to limit the scope of the present disclosure, applications thereof, or uses thereof.

Figure 1:
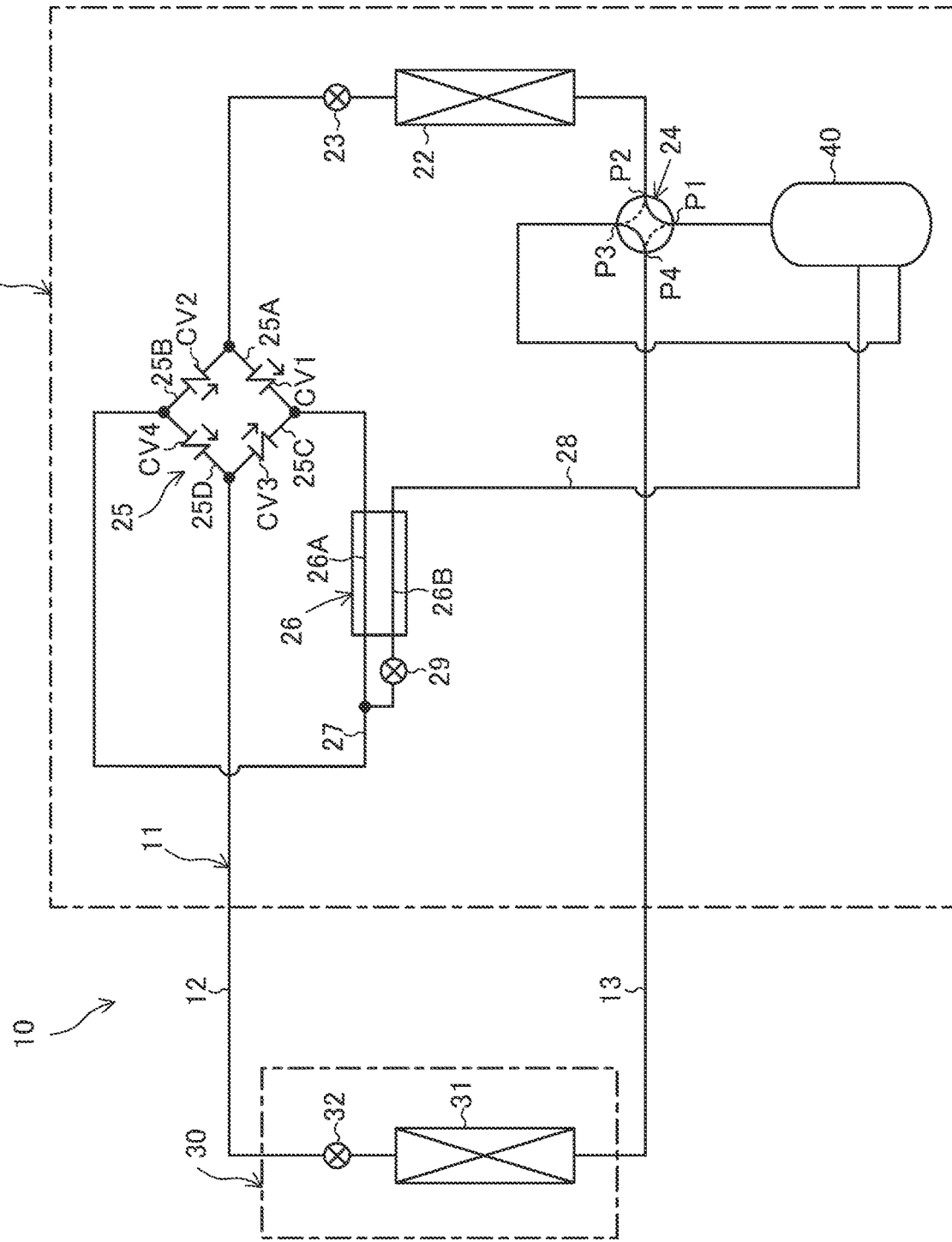
FIG. 1 is a pipe system diagram of an air conditioner according to an embodiment.

A compressor (40) according to the present embodiment is a rotary compressor. The compressor (40) compresses a refrigerant that is a fluid. As illustrated in FIG. 1, the compressor (40) is applied to an air conditioner (10) that is a refrigeration apparatus.

General Configuration of Air Conditioner

The air conditioner (10) switches between cooling and heating. The air conditioner (10) of this example is of a pair type including one outdoor unit (20) and one indoor unit (30). The air conditioner (10) may be of a multi-type including a plurality of indoor units (30).

The air conditioner (10) includes a refrigerant circuit (11) filled with a refrigerant. The air conditioner (10) includes a liquid communication pipe (12) and a gas communication pipe (13). The indoor unit (30) and the outdoor unit (20) are connected to each other via the liquid communication pipe (12) and the gas communication pipe (13). Thus, the refrigerant circuit (11) that is a closed circuit is formed. In the refrigerant circuit (11), a vapor compression refrigeration cycle is performed by circulation of the refrigerant. The refrigerant contains a refrigeration oil for lubricating sliding portions of the compressor (40).

Outdoor Unit

The outdoor unit (20) includes the compressor (40), an outdoor heat exchanger (22), an outdoor expansion valve (23), a four-way switching valve (24), a check-valve circuit (25), and a subcooling heat exchanger (26). The compressor (40) is a swing piston compressor. The outdoor heat exchanger (22) is a heat-source heat exchanger, and is of a cross-fin fin-and-tube type. The outdoor heat exchanger (22) exchanges heat between air conveyed by an outdoor fan (not illustrated) and the refrigerant. The outdoor expansion valve (23) is an electronic expansion valve. In the refrigerant circuit (11), the outdoor expansion valve (23) may be omitted.

The four-way switching valve (24) has a first port (P1), a second port (P2), a third port (P3), and a fourth port (P4). The first port (P1) is connected to a discharge portion of the compressor (40). The second port (P2) is connected to a gas-side end portion of the outdoor heat exchanger (22). The third port (P3) is connected to a suction portion of the compressor (40). The fourth port (P4) is connected to the gas communication pipe (13).

The four-way switching valve (24) switches between a first state and a second state. The four-way switching valve (24) in the first state (a state indicated by solid lines in FIG. 1) allows the first port (P1) and the second port (P2) to communicate with each other and allows the third port (P3) and the fourth port (P4) to communicate with each other. The four-way switching valve (24) in the second state (a state indicated by broken lines in FIG. 1) allows the first port (P1) and the fourth port (P4) to communicate with each other and allows the second port (P2) and the third port (P3) to communicate with each other.

The check-valve circuit (25) includes four pipes (25A, 25B. 25C, 25D) that are connected in a so-called bridge shape, and four check valves (CV1, CV2, CV3, CV4) that are connected to the respective pipes (25A, 25B, 25C, 25D). Specifically, the check-valve circuit (25) includes a first pipe (25A), a second pipe (25B), a third pipe (25C), and a fourth pipe (25D). A first check valve (CV1) is connected to the first pipe (25A). A second check valve (CV2) is connected to the second pipe (25B). A third check valve (CV3) is connected to the third pipe (25C). A fourth check valve (CV4) is connected to the fourth pipe (25D). Each of the check valves (CV1, CV2, CV3, CV4) allows the refrigerant to flow in a direction indicated by arrows in FIG. 1 and prohibits the refrigerant from flowing in the opposite direction.

An inflow end of the first pipe (25A) and an outflow end of the second pipe (25B) are connected to a liquid-side end portion of the outdoor heat exchanger (22). An outflow end of the first pipe (25A) and an outflow end of the third pipe (25C) are connected to an inflow end of a main liquid pipe (27). An inflow end of the third pipe (25C) and an outflow end of the fourth pipe (25D) are connected to the liquid communication pipe (12). An inflow end of the fourth pipe (25D) and an inflow end of the second pipe (25B) are connected to an outflow end of the main liquid pipe (27).

The subcooling heat exchanger (26) has a first flow path (26A) and a second flow path (26B). The subcooling heat exchanger (26) is, for example, a plate heat exchanger. The subcooling heat exchanger (26) exchanges heat between the refrigerant flowing through the first flow path (26A) and the refrigerant flowing through the second flow path (26B).

The outdoor unit (20) includes the main liquid pipe (27), an injection pipe (28), and an injection valve (29). An inflow end of the injection pipe (28) is connected to a downstream side of the first flow path (26A) in the main liquid pipe (27). An outflow end of the injection pipe (28) is connected to an introduction path (61) of the compressor (40). The first flow path (26A) is provided in the middle of the main liquid pipe (27). The second flow path (26B) is provided in the middle of the injection pipe (28).

The injection valve (29) is connected to an upstream side of the second flow path (26B) in the injection pipe (28). The injection valve (29) is an electronic expansion valve.

Indoor Unit

The indoor unit (30) includes an indoor heat exchanger (31) and an indoor expansion valve (32). The indoor heat exchanger (31) is a use heat exchanger, and is of a cross-fin fin-and-tube type. The indoor heat exchanger (31) exchanges heat between air conveyed by an indoor fan (not illustrated) and the refrigerant. The indoor expansion valve (32) is an electronic expansion valve.

Basic Operation Action of Air Conditioner

A basic operation action of the air conditioner (10) will be described. The air conditioner (10) switches between a cooling operation and a heating operation.

Cooling Operation

In the cooling operation, the four-way switching valve (24) is in the first state, the outdoor expansion valve (23) is opened, and the opening degree of the indoor expansion valve (32) is adjusted based on the degree of suction superheating. When the compressor (40) is operated, the refrigerant compressed by the compressor (40) flows through the outdoor heat exchanger (22). In the outdoor heat exchanger (22), the refrigerant radiates heat and condenses. The refrigerant that has passed through the outdoor heat exchanger (22) flows through the first pipe (25A), the main liquid pipe (27), and the fourth pipe (25D) in this order. This refrigerant is decompressed by the indoor expansion valve (32), and then evaporates in the indoor heat exchanger (31). In the indoor heat exchanger (31), indoor air is cooled by the evaporating refrigerant. The refrigerant that has evaporated in the indoor heat exchanger (31) flows into the outdoor unit (20) and is compressed again by the compressor (40).

Heating Operation

In the heating operation, the four-way switching valve (24) is in the second state, the indoor expansion valve (32) is opened, and the opening degree of the outdoor expansion valve (23) is adjusted based on the degree of suction superheating. When the compressor (40) is operated, the refrigerant compressed by the compressor (40) radiates heat and condenses in the indoor heat exchanger (31). In the indoor heat exchanger (31), indoor air is heated by the refrigerant that radiates heat. The refrigerant having radiated heat in the indoor heat exchanger (31) flows through the third pipe (25C), the main liquid pipe (27), and the second pipe (25B) in this order. This refrigerant is decompressed by the outdoor expansion valve (23), and then evaporates in the outdoor heat exchanger (22). The refrigerant that has evaporated in the outdoor heat exchanger (22) is compressed again by the compressor (40).

Injection Action

In the cooling operation and the heating operation described above, the opening degree of the injection valve (29) is appropriately adjusted to perform the following injection action.

When the injection operation is adjusted to a predetermined opening degree, part of the high-pressure liquid refrigerant flowing through the main liquid pipe (27) is branched off to the injection pipe (28). The refrigerant branched off to the injection pipe (28) is decompressed to an intermediate pressure by the injection valve (29) and then flows through the second flow path (26B) of the subcooling heat exchanger (26). In the subcooling heat exchanger (26), the high-pressure liquid refrigerant flowing through the first flow path (26A) exchanges heat with the intermediate-pressure liquid refrigerant flowing through the second flow path (26B). As a result, the refrigerant in the second flow path (26B) evaporates, and the refrigerant in the first flow path (26A) is cooled. In the subcooling heat exchanger (26), the degree of subcooling of the liquid refrigerant increases as described above.

The intermediate-pressure gas refrigerant that has evaporated in the second flow path (26B) of the injection pipe (28) is supplied to a compression chamber (53B) via the introduction path (61) of the compressor (40) (described in detail later).

General Configuration of Compressor

Figure 2:
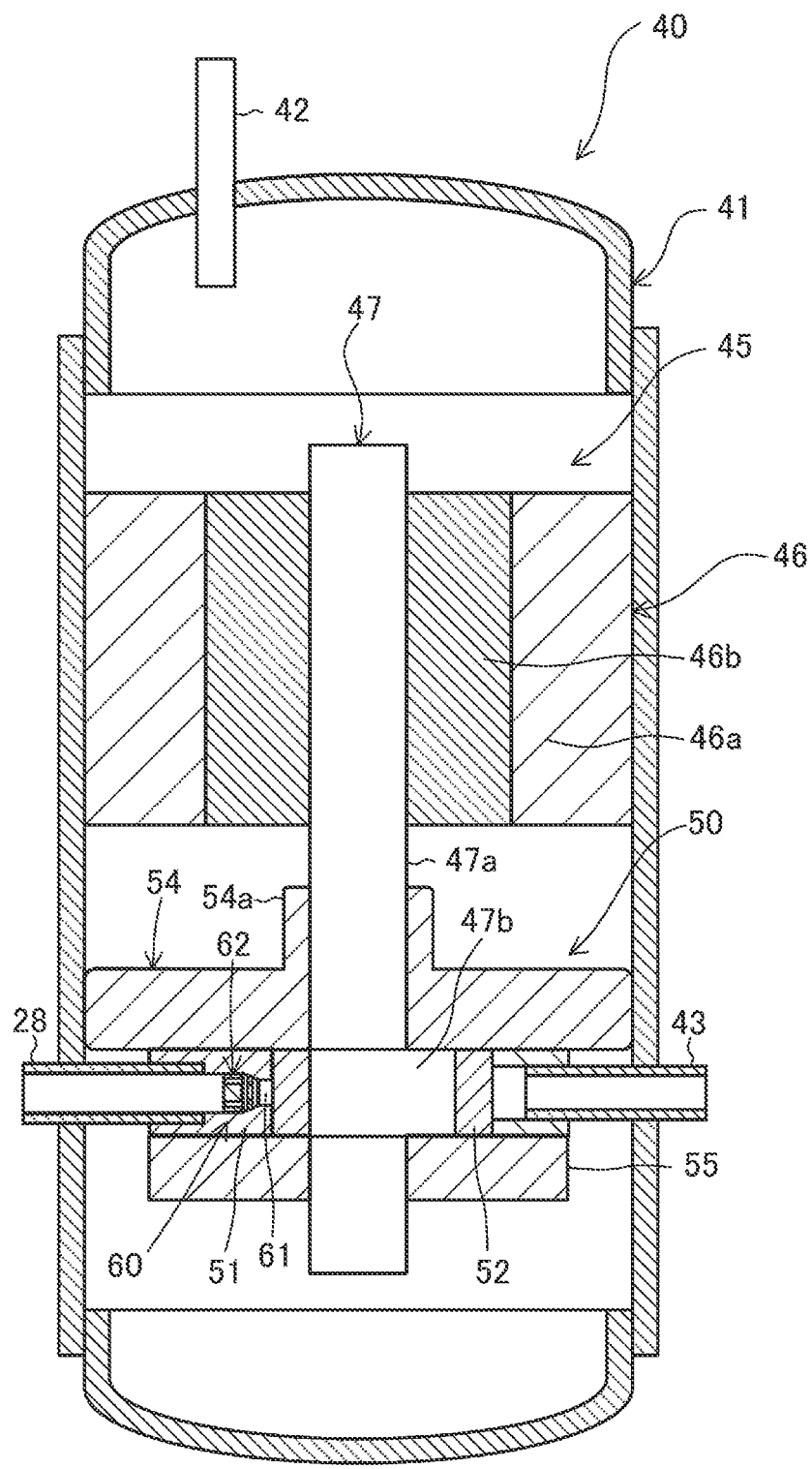
FIG. 2 is a longitudinal sectional view of a compressor.
Figure 3:
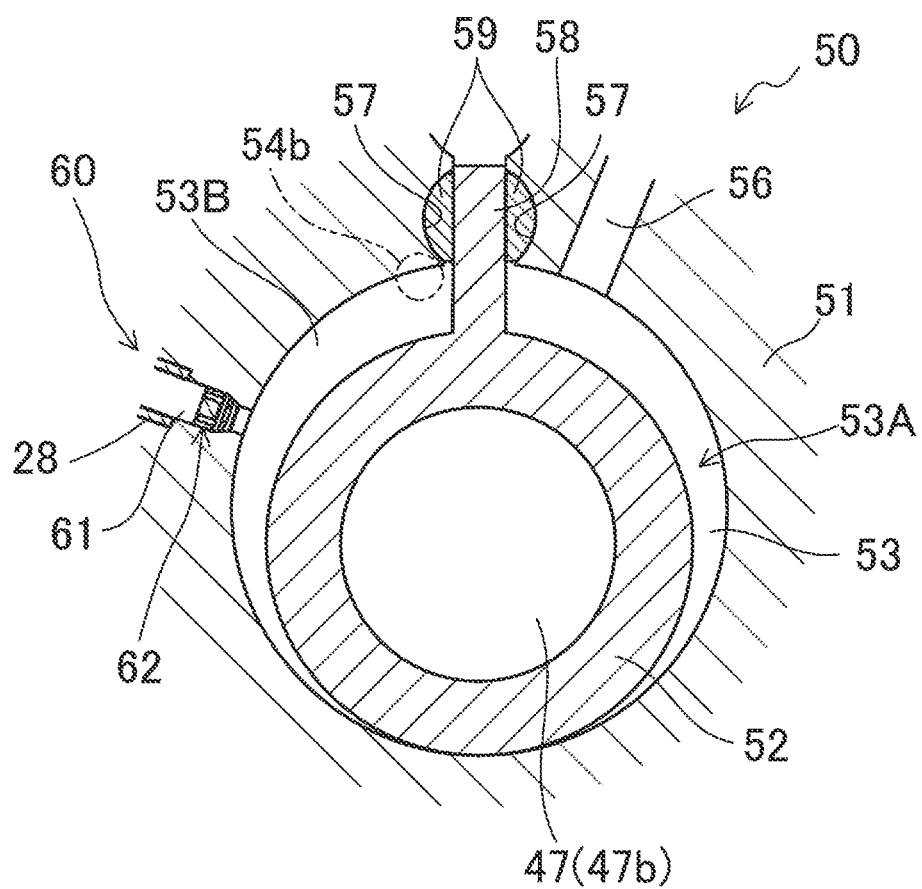
FIG. 3 is a cross-sectional view of a compression mechanism.

The general configuration of the compressor (40) will be described with reference to FIGS. 2 and 3. The compressor (40) compresses a refrigerant that is a fluid. The compressor (40) includes a casing (41), a drive mechanism (45), and a compression mechanism (50).

The casing (41) is formed in a vertically long hollow cylindrical shape. An internal space of the casing (41) is filled with the high-pressure refrigerant. The compressor (40) is of a so-called high-pressure dome type. A discharge pipe (42) is connected to an upper portion of the casing (41). A suction pipe (43) and an injection pipe (28) are connected to a body portion of the casing (41). The refrigeration oil is stored in a bottom portion in the casing (41). The refrigeration oil is drawn into a flow path in a drive shaft and used for lubrication of sliding portions of the compression mechanism (50) and bearings of a drive shaft (47) (not illustrated).

The drive mechanism (45) rotationally drives the compression mechanism (50). The drive mechanism (45) includes an electric motor (46) and the drive shaft (47). The electric motor (46) is coupled to the compression mechanism (50) via the drive shaft (47). The electric motor (46) includes a stator (46a) and a rotor (46b). The stator (46a) is fixed to an inner peripheral surface of the body portion of the casing (41). The rotor (46b) is inserted through the inside of the stator (46a). The drive shaft (47) is fixed inside the rotor (46b).

Electric power is supplied to the electric motor (46) via an inverter device. The electric motor (46) is of an inverter type having a variable number of rotations. The compression mechanism (50) has a variable capacity.

The drive shaft (47) includes a main shaft (47a) and an eccentric shaft (47b). The eccentric shaft (47b) is provided at a lower portion of the main shaft (47a). The axis of the eccentric shaft (47b) is deviated radially outward by a predetermined amount with respect to the axis of the main shaft (47a).

The compression mechanism (50) of this example is of a swing piston type. The compression mechanism (50) includes an annular cylinder (51) and an annular piston (52). A cylinder chamber (53) is formed inside the cylinder (51). The piston (52) performs a swing movement inside the cylinder (51).

In the compression mechanism (50), a front head (54), the cylinder (51), and a rear head (55) are provided in this order from an upper side to a lower side.

The front head (54) is fixed to the body portion of the casing (41). The front head (54) closes an upper opening plane of the cylinder chamber (53) of the cylinder (51). A boss portion (54a) extending axially upward of the drive shaft (47) is formed at the center of the front head (54). A main bearing (not illustrated) that rotatably supports the drive shaft (47) is formed inside the boss portion (54a).

A discharge port (54b) is formed in the front head (54). An inflow end of the discharge port (54b) communicates with the compression chamber (53B) in the cylinder (51). An outflow end of the discharge port (54b) communicates with the internal space of the casing (41). A discharge valve that opens and closes the discharge port (54b) is provided in the front head (54). The discharge valve is constituted by a reed valve or the like, and opens and closes the discharge port (54b).

The rear head (55) is fixed to the body portion of the casing (41). The rear head (55) closes a lower opening plane of the cylinder chamber (53) of the cylinder (51). A sub-bearing (not illustrated) that rotatably supports the drive shaft is formed at the center of the rear head (55).

The cylinder (51) is formed in an annular or cylindrical shape, and the cylinder chamber (53) is formed inside the cylinder (51). The cylinder chamber (53) has a perfect-circle-shaped cross section.

A suction port (56) communicating with a suction chamber (53A) of the cylinder chamber (53) is formed in the cylinder (51). The suction pipe (43) is connected to the suction port (56). A pair of bushing holes (57) are formed in a portion of the cylinder (51) close to the top dead center.

The piston (52) is disposed in the cylinder chamber (53). The piston (52) is formed in a circular annular shape in which the eccentric shaft (47b) is fitted. The piston (52) performs a swing and rotation movement along an inner peripheral surface of the cylinder chamber (53).

The compression mechanism (50) includes a blade (58) and a pair of bushings (59). As illustrated in FIG. 3, the blade (58) is provided integrally with the piston (52). The blade

(58) is coupled to a portion of an outer peripheral surface of the piston (52) close to the bushing holes (57). The blade (58) is formed in a plate shape protruding radially outward of the cylinder chamber (53) from the outer peripheral surface of the piston (52). The blade (58) divides the cylinder chamber (53) into the suction chamber (53A) and the compression chamber (53B). The blade (58) is configured to perform a swing movement as the piston (52) rotates.

The pair of bushings (59) each have a substantially semicircular cross section. The pair of bushings (59) are inserted into the bushing holes (57). The pair of bushings (59) are disposed such that respective flat surfaces thereof face each other. The blade (58) is inserted between the flat surfaces so as to be movable forward and backward. The bushings (59) swing inside the bushing holes (57) while holding the blade (58) so as to be movable forward and backward.

Basic Action of Compressor

When the electric motor (46) is energized, the drive shaft (47) is rotationally driven, and the piston (52) eccentrically rotates. The low-pressure gas refrigerant in the refrigerant circuit (11) flows through the suction pipe (43) and flows into the cylinder chamber (53).

The compression mechanism (50) repeatedly performs a suction stroke, a compression stroke, and a discharge stroke in this order. When the piston (52) rotates clockwise in FIG. 3, the volume of the suction chamber (53A) gradually increases. As a result, the low-pressure refrigerant is gradually sucked into the suction chamber (53A) via the suction port (56) (suction stroke). This suction stroke takes place until just before a seal point between the piston (52) and the cylinder chamber (53) has completely passed the suction port (56).

When the seal point has passed the suction port (56), the space that was the suction chamber (53A) becomes the compression chamber (53B). When the piston (52) further rotates, the volume of the compression chamber (53B) gradually decreases, and the refrigerant is compressed in the compression chamber (53B) (compression stroke). When the internal pressure of the compression chamber (53B) becomes equal to or higher than a predetermined value, the discharge valve is opened, and the refrigerant in the compression chamber (53B) is discharged to the internal space through the discharge port (54b) (discharge stroke).

The refrigerant in the internal space flows out of the compressor (40) through the discharge pipe (42).

Summary of Introduction Mechanism

As illustrated in FIGS. 2 to 5, the compressor (40) includes an introduction mechanism (60) that introduces the refrigerant into the compression chamber (53B). The introduction mechanism (60) includes the introduction path (61) and a backflow suppression mechanism (62). The introduction path (61) radially extends through the cylinder (51). An inflow end of the introduction path (61) communicates with the injection pipe (28). An outflow end of the introduction path (61) opens toward the compression chamber (53B). The backflow suppression mechanism (62) suppresses a backflow of the refrigerant in the compression chamber (53B) toward the injection pipe (28).

Introduction Path

Figure 4:
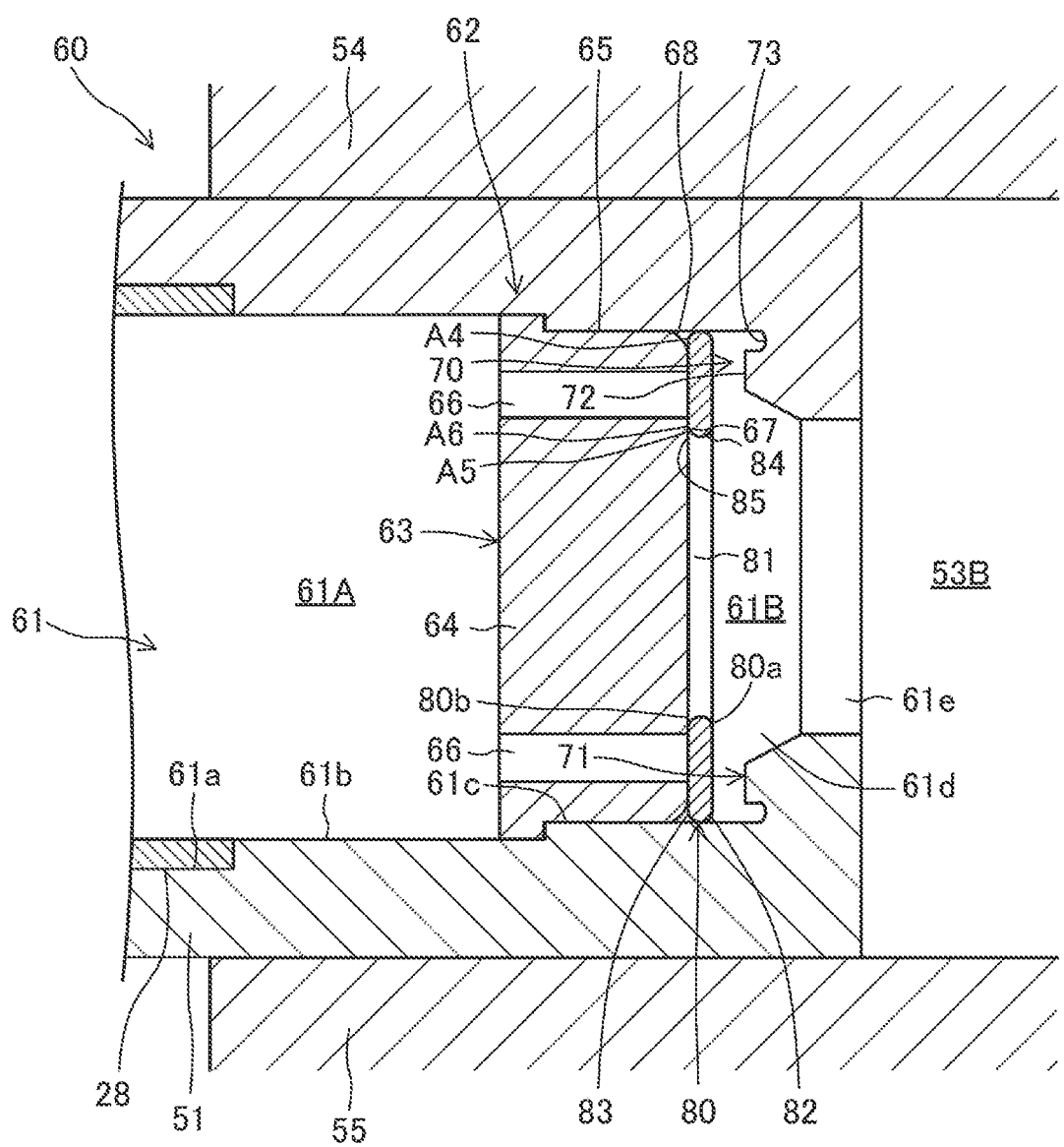
FIG. 4 is an enlarged longitudinal sectional view of main portions of an introduction path and a backflow suppression mechanism, and illustrates a state in which a valve body is at a first position.

As illustrated in FIG. 4, the introduction path (61) has a circular section perpendicular to its axis. An inner peripheral surface of the introduction path (61) includes a first inner peripheral portion (61a), a second inner peripheral portion (61b), and a third inner peripheral portion (61c) in this order from the upstream side toward the downstream side. Hereinafter, the "upstream side" is also referred to as a "rear side", and the "downstream side" is also referred to as a "front side". The inside diameter of an inner peripheral surface of the first inner peripheral portion (61a) is larger than the inside diameter of the second inner peripheral portion (61b). The inside diameter of the second inner peripheral portion (61b) is larger than the inside diameter of the third inner peripheral portion (61c). An end portion of the injection pipe (28) is fitted to the first inner peripheral portion (61a).

The introduction path (61) includes a reduced diameter hole (61d) and an outflow hole (61e). The reduced diameter hole (61d) and the outflow hole (61e) are formed on the downstream side of the introduction path (61). The reduced diameter hole (61d) is formed on the inner side of a valve seat portion (70). The inside diameter of the reduced diameter hole (61d) decreases toward the downstream side. The outflow hole (61e) is connected to a downstream end of the reduced diameter hole (61d). An outflow end of the outflow hole (61e) opens to the compression chamber (53B).

Summary of Backflow Suppression Mechanism

As illustrated in FIG. 4, the backflow suppression mechanism (62) includes a valve holder (63) (first valve receiving portion), the valve seat portion (70) (second valve receiving portion), and a valve body (80). In the introduction path (61), the valve holder (63), the valve body (80), and the valve seat portion (70) are disposed in this order from the upstream side toward the downstream side of the introduction path (61). The valve holder (63) and the valve body (80) are constituted by members separate from the cylinder (51). The valve seat portion (70) is formed integrally with the cylinder (51). The valve body (80) reciprocates between the valve holder (63) and the valve seat portion (70) in accordance with a change in the internal pressure of the compression chamber (53B).

Valve Holder

The valve holder (63) partitions the introduction path (61) into an upstream-side flow path (61A) and a downstream-side flow path (61B). The upstream-side flow path (61A) is formed on the upstream side of the valve holder (63). The downstream-side flow path (61B) is formed on the downstream side of the valve holder (63). The valve holder (63) includes a disk-shaped base portion (64) and a substantially columnar main body (65) extending forward from the base portion (64) toward the compression chamber (53B). The axis of the base portion (64) and the axis of the main body (65) coincide with each other. The base portion (64) is fitted to the second inner peripheral portion (61b) of the introduction path (61). The main body (65) is fitted to the third inner peripheral portion (61c) of the introduction path (61).

Figure 6:
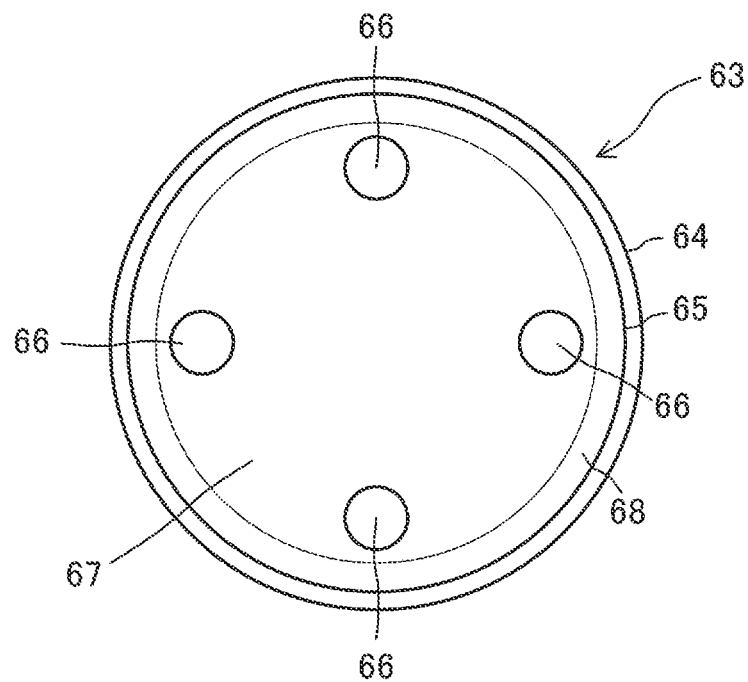
FIG. 6 is a front view (view seen from a downstream side) of a valve holder.

As illustrated in FIGS. 4 and 6, four communication paths (66) are formed in the valve holder (63) to allow the upstream-side flow path (61A) and the downstream-side flow path (61B) to communicate with each other. The number of communication paths (66) is merely an example, and may be three or less, or five or more. The communication paths (66) each have a circular section perpendicular to its axis. The four communication paths (66) are disposed close to an outer edge of the valve holder (63). The four communication paths (66) are circumferentially arranged at equal pitches. The four communication paths (66) are located at positions axially overlapping the valve body (80). A first valve seat (67) facing a rear surface (80b) (first surface) of the valve body (80) is formed on a surface of the valve holder (63) on the downstream side of the introduction path (61).

The first valve seat (67) of the valve holder (63) is formed in a substantially flat shape. The first valve seat (67) comes into surface contact with the rear surface (80b) of the valve body (80).

An outer-edge main-body-side arc portion (68) is formed at an outer edge of a front-side portion of the main body (65) of the valve holder (63). The outer-edge main-body-side arc portion (68) is formed in an arc shape in an axial sectional view.

Valve Seat Portion

Figure 7:
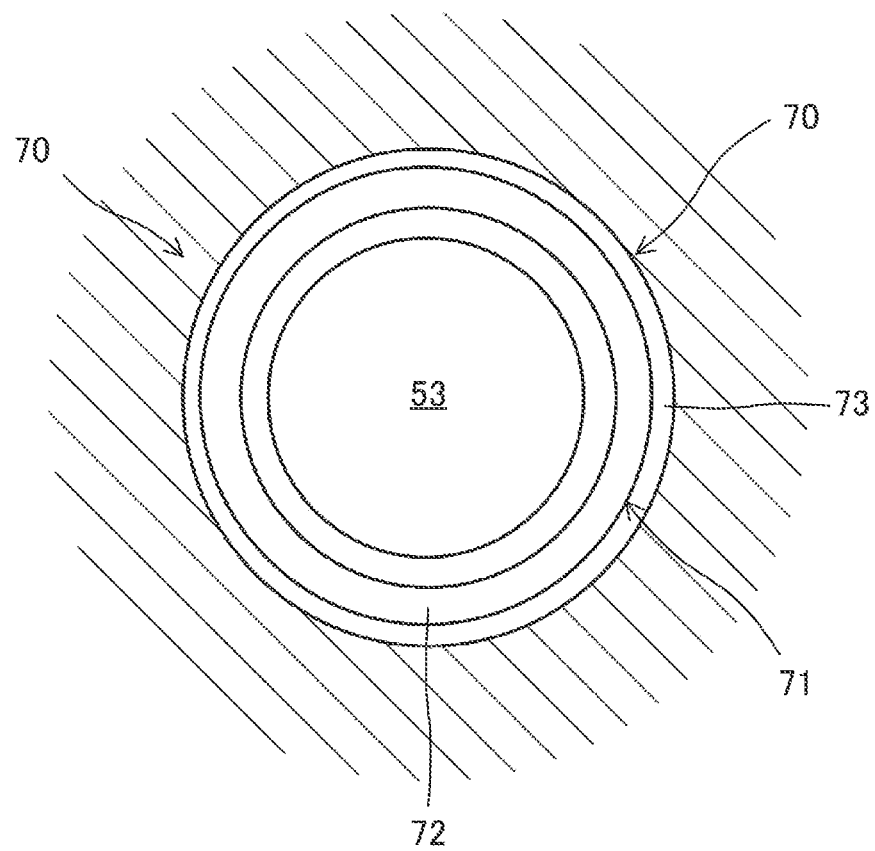
FIG. 7 is a top view (view seen from an upstream side) of a valve seat.

As illustrated in FIGS. 4 and 7, the valve seat portion (70) is provided around the outflow hole (61e). The valve seat portion (70) has a second protrusion (71) protruding from an inner peripheral edge portion of the outflow hole (61e) toward the upstream side of the introduction path (61). The second protrusion (71) is formed in a substantially circular annular shape. A second valve seat (72) facing a front surface (80a) (second surface) of the valve body (80) is formed at a distal end of the second protrusion (71). The second valve seat (72) is constituted by a circular annular flat surface. The second valve seat (72) of the present example axially overlaps a portion of the valve body (80) close to the outer edge.

An annular groove (73) is formed around the second protrusion (71). The groove (73) is formed between the second protrusion (71) and the inner peripheral surface of the introduction path (61). An opening plane of the groove (73) faces the front surface (80a) of the valve body (80).

Valve Body

Figure 8:
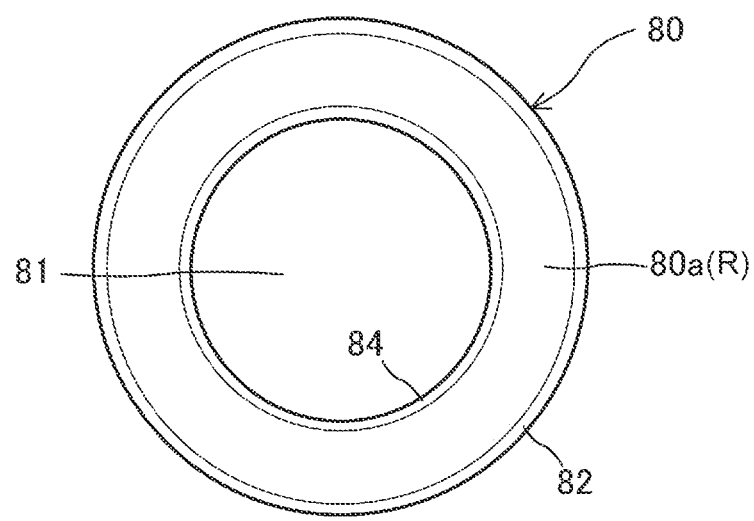
FIG. 8 is a front view of the valve body.
Figure 9:
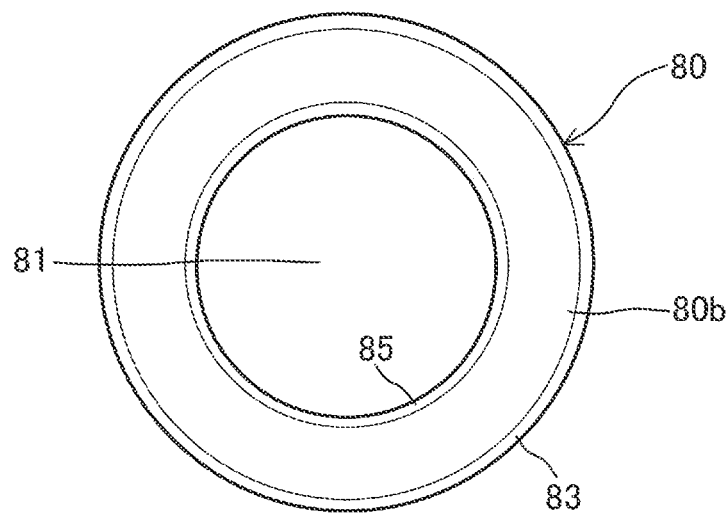
FIG. 9 is a rear view of the valve body.

As illustrated in FIGS. 4, 8, and 9, the valve body (80) is formed in an axially flat circular annular shape. The valve body (80) of this example is formed in a disk shape having one hole (81). The hole (81) is formed in a central portion of the valve body (80). The hole (81) of the present example is formed in a circular shape. The center of an outer edge of the valve body (80) coincides with the center of the hole (81).

An outer-edge front-side arc portion (82) is formed at an outer edge of the front surface (80a) of the valve body (80). An outer-edge rear-side arc portion (83) is formed at an outer edge of the rear surface (80b) of the valve body (80). An inner-edge front-side arc portion (84) is formed at an edge (inner edge) of the hole (81) in the front surface (80a) of the valve body (80). An inner-edge rear-side arc portion (85) is formed at an edge (inner edge) of the hole (81) in the rear surface (80b) of the valve body (80). Each of the outer-edge front-side arc portion (82), the outer-edge rear-side arc portion (83), the inner-edge front-side arc portion (84), and the inner-edge rear-side arc portion (85) is formed in an arc shape in an axial sectional view of the valve body (80).

A surface exposed to the introduction path (61) is formed in a portion of the front surface (80a) of the valve body (80) extending radially inward of the second valve seat (72). This surface faces the downstream side of the downstream-side flow path (61B). This surface constitutes a pressure receiving portion (R) on which the pressure of the compression chamber (53B) acts.

Action of Backflow Suppression Mechanism

Figure 5:
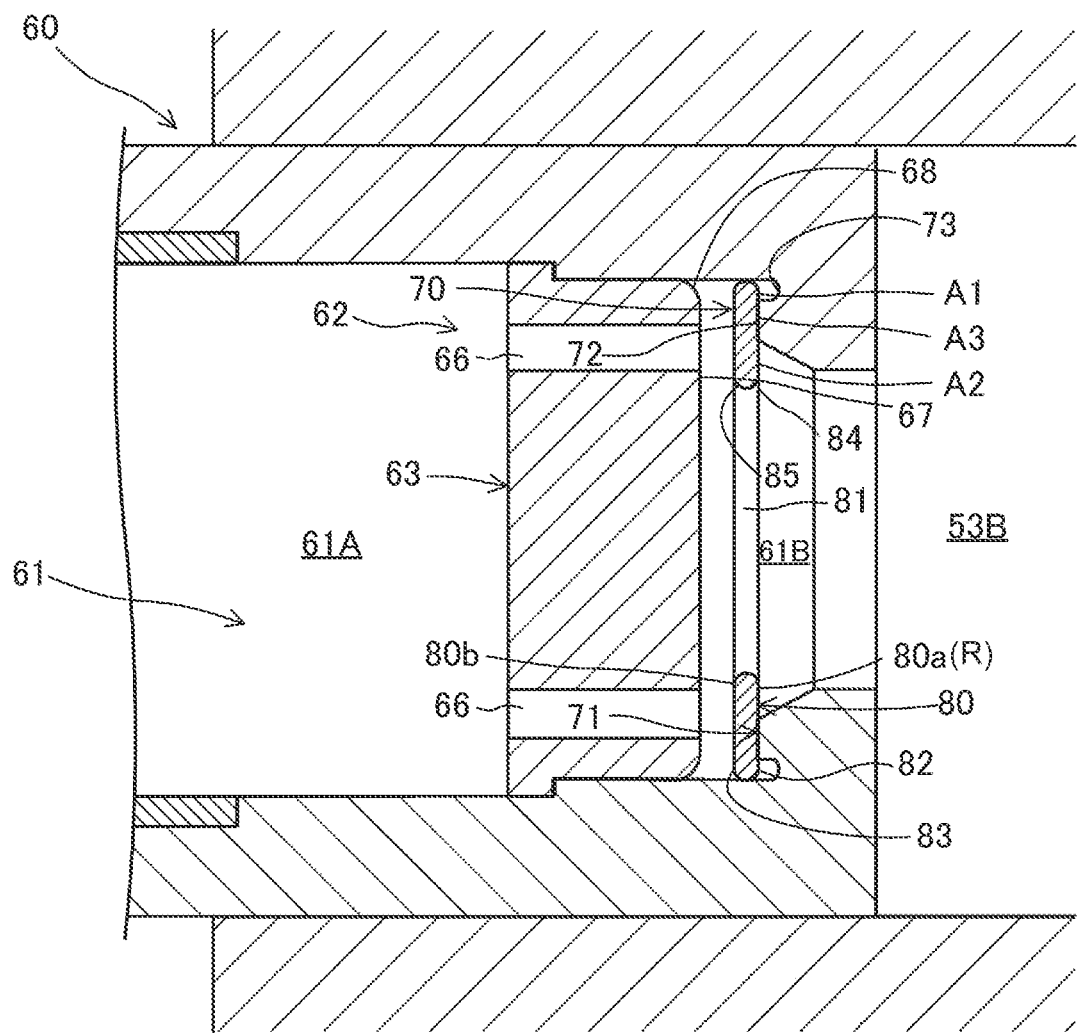
FIG. 5 is an enlarged longitudinal sectional view of the main portions of the introduction path and the backflow suppression mechanism, and illustrates a state in which the valve body is at a second position.

The valve body (80) reciprocates between a first position illustrated in FIG. 4 and a second position illustrated in FIG. 5 in accordance with a change in the internal pressure of the compression chamber (53B). Specifically, when the internal pressure of the compression chamber (53B) becomes higher than the internal pressure of the upstream-side flow path (61A), the internal pressure of the compression chamber (53B) acts on the pressure receiving portion (R), and the valve body (80) moves to the first position. When the internal pressure of the compression chamber (53B) becomes lower than the internal pressure of the upstream-side flow path (61A), the valve body (80) moves to the second position.

When the valve body (80) is at the first position illustrated in FIG. 4, the valve body (80) is in contact with the first valve seat (67) of the valve holder (63). The valve body (80) at the first position closes all the communication paths (66). In this state, the valve body (80) prohibits a backflow of the refrigerant.

When the valve body (80) is at the second position illustrated in FIG. 5, the valve body (80) is in contact with the second valve seat (72) of the valve seat portion (70). The valve body (80) at the second position opens all the communication paths (66). In this state, the refrigerant in the introduction path (61) passes through the respective communication paths (66) and the hole (81) of the valve body (80) and is then introduced into the compression chamber (53B).

Problem Related to Breakage of Valve Body

During operation of the compressor (40), the valve body (80) reciprocates between the first position and the second position at high speed. Thus, the valve body (80) alternately and repeatedly collides with the first valve seat (67) and the second valve seat (72). In the swing piston compression mechanism (50) of this embodiment, the change in the internal pressure of the compression chamber (53B) during one rotation of the piston (52) is large. Thus, the valve body (80) collides with the first valve seat (67) and the second valve seat (72) at high speed and high frequency in accordance with the change in the internal pressure.

In the compressor of related art, for example, a pressure receiving portion is formed in a portion on an inner edge side of a valve body, and the remaining portion is entirely in contact with a valve seat of a valve seat portion. Thus, when the valve body collides with the valve seat, only the portion on the inner edge side of the valve body is deformed by collision energy, and stress may be concentrated on this portion. Due to such stress concentration on the inner edge of the valve body, there is a problem that the valve body is cracked or fatigue-broken.

Regarding Non-Contact Region

In the present embodiment, in consideration of the above-described problem, the following configuration is employed in order to suppress breakage of the valve body (80).

Front Surface of Valve Body

Figure 10:
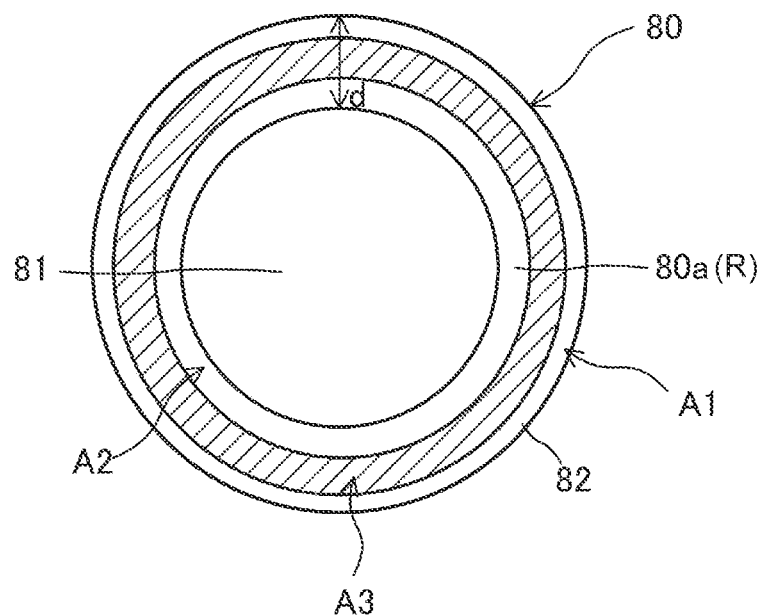
FIG. 10 is a front view of the valve body illustrating a first non-contact region, a second non-contact region, and a contact region.
Figure 11:
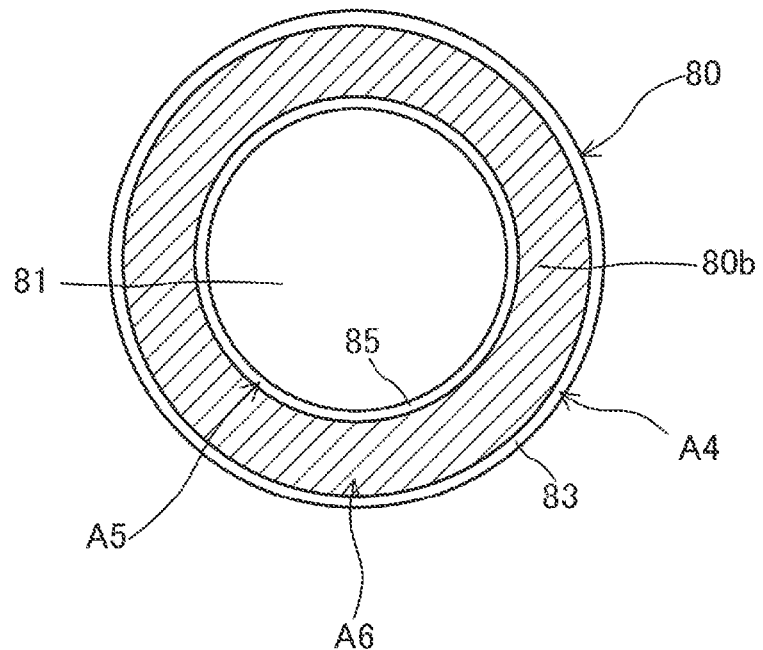
FIG. 11 is a rear view of the valve body illustrating a first non-contact region, a second non-contact region, and a contact region.

As illustrated in FIG. 10, a front-side first non-contact region (A1), a front-side second non-contact region (A2), and a front-side contact region (A3) are formed on the front surface (80a) of the valve body (80). In FIG. 11, a hatched region indicates a contact region, and a white region indicates a non-contact region.

As illustrated in FIG. 5, a region that is not in contact with the second valve seat (72) is formed on the front surface (80a) of the valve body (80) at the second position within a predetermined range extending radially inward from the outer edge of the valve body (80). The front-side first non-contact region (A1) corresponds to this region. The front-side first non-contact region (A1) is formed in a circular annular shape. An internal space of the groove (73) is located in front of the front-side first non-contact region (A1).

A region that is not in contact with the second valve seat (72) is formed on the front surface (80a) of the valve body (80) at the second position within a predetermined range extending radially outward from the hole (81) of the valve body (80). The front-side second non-contact region (A2)

corresponds to this region. The front-side second non-contact region (A2) is formed in a circular annular shape. A space of the introduction path (61) is present in front of the front-side second non-contact region (A2). The front-side second non-contact region (A2) is exposed to a downstream-side space of the introduction path (61). The front-side second non-contact region (A2) constitutes the pressure receiving portion (R) described above.

A region that comes into contact with the second valve seat (72) of the second protrusion (71) is formed on the front surface (80a) of the valve body (80) at the second position. The front-side contact region (A3) corresponds to this area. The front-side contact region (A3) is a region between the front-side first non-contact region (A1) and the front-side second non-contact region (A2). The front-side contact region (A3) is formed in a circular annular shape.

As illustrated in FIG. 10, it is assumed that d is a radial length from the outer edge of the valve body (80) to an outermost peripheral portion of the hole (81). It is preferable that the front-side contact region (A3) is in a range located radially inward at (¼)×d or more from the outer edge of the valve body (80). In addition, it is preferable that the front-side contact region (A3) is in a range located radially outward at (¼)×d or more from an inner edge of the valve body (80).

It is further preferable that the front-side contact region (A3) is in a range located radially inward at (⅓)×d or more from the outer edge of the valve body (80). In addition, it is preferable that the front-side contact region (A3) is in a range located radially outward at (⅓)×d or more from the inner edge of the valve body (80).

Rear Surface of Valve Body

As illustrated in FIG. 11, a rear-side first non-contact region (A4), a rear-side second non-contact region (A5), and a rear-side contact region (A6) are formed on the rear surface (80b) of the valve body (80). In FIG. 11, a hatched region indicates a contact region, and a white region indicates a non-contact region.

As illustrated in FIG. 4, a region that is not in contact with the first valve seat (67) is formed on the rear surface (80b) of the valve body (80) at the first position within a predetermined range extending radially inward from the outer edge of the valve body (80). The rear-side first non-contact region (A4) corresponds to this region. The rear-side first non-contact region (A4) is formed in a circular annular shape.

The rear-side first non-contact region (A4) is constituted by the outer-edge rear-side arc portion (83) that is a second arc portion. By forming the outer-edge rear-side arc portion (83), a gap is formed between the valve body (80) and the valve holder (63). With this gap, the outer-edge rear-side arc portion (83) no longer comes into contact with the first valve seat (67).

In addition, the rear-side first non-contact region (A4) is constituted by the outer-edge main-body-side arc portion (68) that is a fourth arc portion. By forming the outer-edge main-body-side arc portion (68), a gap is formed between the valve body (80) and the valve holder (63). With this gap, the outer-edge main-body-side arc portion (68) no longer comes into contact with the valve body (80).

A region that is not in contact with the first valve seat (67) is formed on the rear surface (80b) of the valve body (80) at the second position within a predetermined range extending radially outward from the hole (81) of the valve body (80). The rear-side second non-contact region (A5) corresponds to this region. The rear-side second non-contact region (A5) is formed in a circular annular shape.

The rear-side second non-contact region (A5) is constituted by the inner-edge rear-side arc portion (85) that is a third arc portion. By forming the inner-edge rear-side arc portion (85), a gap is formed between the valve body (80) and the valve holder (63). With this gap, the inner-edge rear-side arc portion (85) no longer comes into contact with the first valve seat (67).

Effects of Non-Contact Regions

As illustrated in FIG. 5, when the valve body (80) collides with the second valve seat (72) at the distal end of the second protrusion (71) of the valve seat portion (70), the front-side contact region (A3) and the second valve seat (72) come into surface contact with each other. In contrast, the front-side first non-contact region (A1) and the front-side second non-contact region (A2) do not come into contact with the second valve seat (72). Thus, when the valve body (80) collides with the second valve seat (72), both an outer-edge-side portion of the valve body (80) corresponding to the front-side first non-contact region (A1) and an inner-edge-side portion of the valve body (80) corresponding to the front-side second non-contact region (A2) are deformed forward. Due to these deformations, collision energy acting on the valve body (80) can be dispersed to the inner-edge-side portion and the outer-edge-side portion. Thus, the stress generated inside the valve body (80) can be dispersed as compared with the related art. As a result, when the valve body (80) collides with the second valve seat (72), breakage of the valve body (80) due to stress concentration on the valve body (80) can be suppressed.

As illustrated in FIG. 4, when the valve body (80) collides with the first valve seat (67) of the valve holder (63), the rear-side contact region (A6) and the first valve seat (67) come into surface contact with each other. In contrast, the rear-side first non-contact region (A4) and the rear-side second non-contact region (A5) do not come into contact with the first valve seat (67). Thus, when the valve body (80) collides with the first valve seat (67), both an outer-edge-side portion of the valve body (80) corresponding to the rear-side first non-contact region (A4) and an inner-edge-side portion of the valve body (80) corresponding to the rear-side second non-contact region (A5) are deformed rearward. Due to these deformations, collision energy acting on the valve body (80) can be dispersed to the inner-edge-side portion and the outer-edge-side portion. Thus, the stress generated inside the valve body (80) can be dispersed as compared with the related art. As a result, when the valve body (80) collides with the first valve seat (67), breakage of the valve body (80) due to stress concentration on the valve body (80) can be suppressed.

An embodiment provides a rotary compressor including a drive mechanism (45), a compression mechanism (50) configured to be rotationally driven by the drive mechanism (45), an introduction path (61) configured to introduce a fluid into a compression chamber (53B) of the compression mechanism (50), and a backflow suppression mechanism (62) configured to suppress a backflow of the fluid in the introduction path (61). The backflow suppression mechanism (62) includes a first valve receiving portion (63) (valve holder) disposed in the introduction path (61), a second valve receiving portion (70) (valve seat portion) disposed on a downstream side of the first valve receiving portion (63) in the introduction path (61), and a valve body (80) disposed between the first valve receiving portion (63) and the second valve receiving portion (70). The first valve receiving portion (63) partitions the introduction path (61) into an inflow-side flow path (61A) and an outflow-side flow path (61B), and has a communication path (66) that allows the two flow paths (61A, 61B) to communicate with each other and a first valve seat (67) facing a first surface (80*b*) (rear surface) of the valve body (80). The second valve receiving portion (70) has a second valve seat (72) facing a second surface (80*a*) (front surface) of the valve body (80). The valve body (80) has a pressure receiving portion (R) on which a pressure of the compression chamber (53B) acts. The backflow suppression mechanism (62) is configured to reciprocate between a first position at which the valve body (80) is in contact with the first valve seat (67) and closes the communication path (66), and a second position at which the valve body (80) is in contact with the second valve seat (72) and opens the communication path (66), in accordance with a change in the pressure of the compression chamber (53B). At least one hole (81) through which the fluid supplied to the compression chamber (53B) passes when the valve body (80) is at the second position is formed in the valve body (80). At least one surface (80*a*, 80*b*) of the first surface (80*b*) and the second surface (80*a*) of the valve body (80) includes an annular first non-contact region (A1, A4) (front-side first non-contact region (A1) and rear-side first non-contact region (A4)) that is formed in a predetermined range extending radially inward from an outer edge of the valve body (80) and that does not come into contact with a corresponding valve seat (67, 72), an annular second non-contact region (A2, A5) (front-side second non-contact region (A1) and rear-side second non-contact region (A4)) that is formed in a predetermined range extending radially outward from the hole (81) of the valve body (80) and that does not come into contact with a corresponding valve seat (67, 72), and a contact region (A3, A6) (front-side contact region (A3) and rear-side contact region (A6)) that is formed between the first non-contact region (A1, A4) and the second non-contact region (A2, A5) and that comes into contact with a corresponding valve seat (67, 72).

In this embodiment, when the valve body (80) collides with the valve seat portion (70), respective portions corresponding to the front-side first non-contact region (A1) and the front-side second non-contact region (A2) are deformed forward. Hence, the collision energy acting on the valve body (80) can be absorbed by these portions, and the internal stress of the valve body (80) can be dispersed. Thus, it is possible to suppress cracking or fatigue-breaking of the valve body (80) due to high-speed and high-frequency collision of the valve body (80) with the valve seat portion (70).

Similarly, when the valve body (80) collides with the valve holder (63), respective portions corresponding to the rear-side first non-contact region (A4) and the rear-side second non-contact region (A5) are deformed rearward. Hence, the collision energy acting on the valve body (80) can be absorbed by these portions, and the internal stress of the valve body (80) can be dispersed. Thus, it is possible to suppress cracking or fatigue-breaking of the valve body (80) due to high-speed and high-frequency collision of the valve body (80) with the valve holder (63).

By preventing breakage of the valve body (80) as described above, the backflow suppression mechanism (62) can reliably provide the function of preventing a backflow of the refrigerant. Thus, it is possible to suppress a decrease in compression efficiency caused by the backflow of the refrigerant, and to ensure the reliability of the compressor (40).

In an embodiment, the second valve receiving portion (70) has a second protrusion (71) protruding toward the second surface (80*a*) of the valve body (80), the second valve seat (72) is formed at a distal end of the second protrusion (71), and the second non-contact region (A2) (front-side second non-contact region) of the second surface (80*a*) of the valve body (80) constitutes the pressure receiving portion (R).

In this embodiment, by forming the second protrusion (71) at the valve seat portion (70), the front-side first non-contact region (A1) and the front-side second non-contact region (A2) can be easily formed on the second surface (80*a*). Since the front-side second non-contact region (A2) faces the downstream side of the introduction path (61), the front-side second non-contact region (A2) can function as the pressure receiving portion (R) that receives the internal pressure of the compression chamber (53B).

In an embodiment, the compression mechanism (50) is configured to compress a refrigerant as the fluid containing a refrigeration oil, and an annular groove (73) is formed between the second protrusion (71) and an inner peripheral surface of the introduction path (61).

In this embodiment, the refrigeration oil contained in the refrigerant accumulates in the annular groove (73). In this state, when the valve body (80) moves from the first position illustrated in FIG. 4 to the second position illustrated in FIG. 5, the oil pressure of the refrigeration oil in the groove (73) increases, and this oil pressure can act on the front surface (80*a*) of the valve body (80). Thus, the speed at which the valve body (80) moves toward the valve seat portion (70) can be reduced, and the collision energy acting on the valve body (80) can be reduced. As a result, breakage of the valve body (80) can be suppressed.

In an embodiment, the valve body (80) is formed in a circular annular shape having the hole (81) that is one circular hole in a central portion of the valve body (80).

In this embodiment, the front-side second non-contact region (A2) and rear-side second non-contact region (A5) having circular annular shapes can be formed around the one hole (81) of the valve body (80). Hence, when the valve body (80) collides with the valve seat portion (70), the portion corresponding to the front-side second non-contact region (A2) can be uniformly deformed over the entire circumference. Thus, stress concentration on the inner edge of the valve body (80) can be circumferentially dispersed.

In an embodiment, when d is a radial length from the outer edge of the valve body (80) to the hole (81), the contact region (A3) (front-side contact region) is formed in a range located radially inward at ($\frac{1}{4}$)×d or more from the outer edge of the valve body (80) and radially outward at ($\frac{1}{4}$)×d or more from the hole (81).

In this embodiment, both of the radial length of the front-side first non-contact region (A1) and the radial length of the front-side second non-contact region (A2) can be ensured to be ($\frac{1}{4}$)×d or more. Thus, when the valve body (80) collides with the valve seat portion (70), a sufficient amount of deformation can be ensured between the portion of the valve body (80) corresponding to the front-side first non-contact region (A1) and the portion of the valve body (80) corresponding to the front-side second non-contact region (A2). As a result, the stress generated inside the valve body (80) can be reduced.

More preferably, the contact region (A3) (front-side contact region) is formed in a range located radially inward at ($\frac{1}{3}$)×d or more from the outer edge of the valve body (80) and radially outward at ($\frac{1}{3}$)×d or more from the hole (81). Thus, when the valve body (80) collides with the valve seat portion (70), the amount of deformation of the portion of the valve body (80) corresponding to the front-side first non-contact region (A1) and the portion of the valve body (80) corresponding to the front-side second non-contact region (A2) can be further increased. As a result, the stress generated inside the valve body (80) can be further reduced.

Similarly, the rear-side contact region (A6) may be formed in a range located radially inward at (¼)×d or more from the outer edge of the valve body (80) and radially outward at (¼)×d or more from the hole (81). Thus, when the valve body (80) collides with the valve holder (63), the amount of deformation of the portion of the valve body (80) corresponding to the rear-side first non-contact region (A4) and the portion of the valve body (80) corresponding to the rear-side second non-contact region (A5) can be ensured. As a result, the stress generated inside the valve body (80) can be reduced.

More preferably, the rear-side contact region (A6) is formed in a range located radially inward at (⅓)×d or more from the outer edge of the valve body (80) and radially outward at (⅓)×d or more from the hole (81). Thus, when the valve body (80) collides with the valve holder (63), the amount of deformation of the portion of the valve body (80) corresponding to the rear-side first non-contact region (A4) and the portion of the valve body (80) corresponding to the rear-side second non-contact region (A5) can be further increased. As a result, the stress generated inside the valve body (80) can be reduced.

In an embodiment, a second arc portion (83) (outer-edge rear-side arc portion) that is formed in an arc shape in an axial sectional view and that constitutes the first non-contact region (A4) (rear-side first non-contact region) is provided at an outer edge of the first surface (80b) (rear surface) of the valve body (80).

By forming the outer-edge rear-side arc portion (83) in the valve body (80), a gap can be ensured between the valve body (80) and the valve holder (63). Thus, the rear-side first non-contact region (A4) can be easily ensured.

Alternatively, the front-side first non-contact region (A1) may be ensured by an outer-edge front-side arc portion (82) formed at an outer edge of the front surface (80a) of the valve body (80).

In an embodiment, a third arc portion (85) (inner-edge rear-side arc portion) that is formed in an arc shape in an axial sectional view and that constitutes the second non-contact region (A5) (rear-side second non-contact region) is provided at an edge of the hole (81) of the first surface (80b) (rear surface) of the valve body (80).

By forming the inner-edge rear-side arc portion (85) at the valve body (80), a gap can be ensured between the valve body (80) and the valve holder (63). Thus, the rear-side second non-contact region (A5) can be easily ensured.

Alternatively, the front-side second non-contact region (A2) may be ensured by an inner-edge front-side arc portion (84) formed at an edge of the hole (81) of the front surface (80a) of the valve body (80).

In an embodiment, a fourth arc portion (68) (outer-edge main-body-side arc portion) that is formed in an arc shape in an axial sectional view to form the first non-contact region (A4) (rear-side first non-contact region) is provided at an outer edge of the first valve receiving portion (63) (valve holder).

In this embodiment, by forming the outer-edge main-body-side arc portion (68) in the valve holder (63), a gap can be ensured between the valve body (80) and the valve holder (63). Thus, the rear-side second non-contact region (A5) can be easily ensured.

In an embodiment, the compression mechanism (50) is of a swing piston type.

In this embodiment, the rate of increase in the pressure of the compression chamber (53B) during one rotation of the piston (52) is higher than that of other types (for example, scroll type). Hence, the speed of the reciprocation of the valve body (80) increases, and the frequency of collision of the valve body (80) with the valve seat (67, 72) increases. However, in this embodiment, the internal stress of the valve body (80) can be dispersed to the outer-edge-side portion and the inner-edge-side portion thereof. Thus, breakage of the valve body (80) can be suppressed, and the reliability of the backflow suppression mechanism (62) can be ensured.

Modifications of Embodiment

The backflow suppression mechanism (62) according to the above-described embodiment may have configurations of modifications below.

Modification 1

Figure 12:
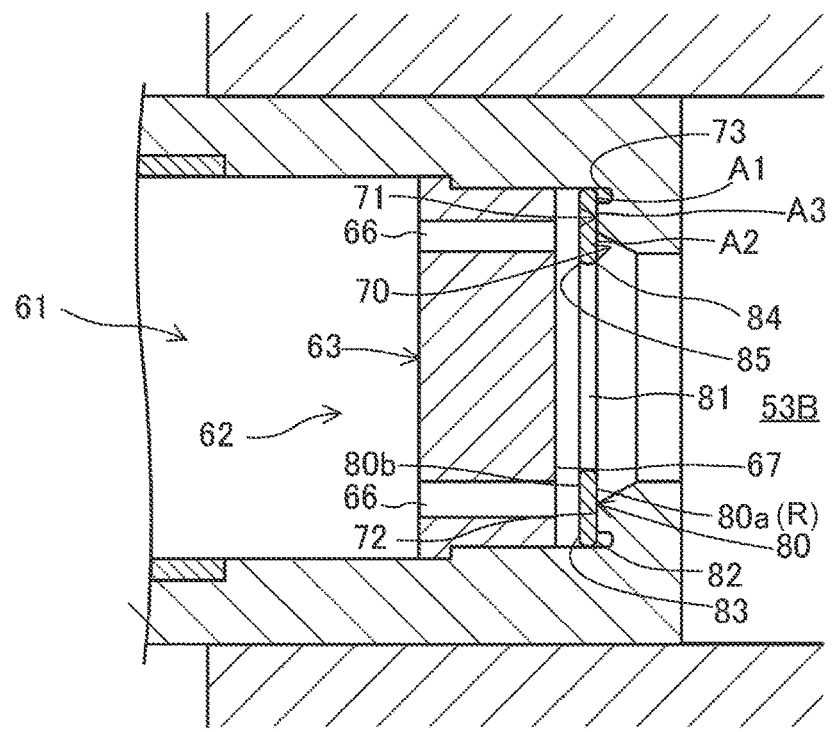
FIG. 12 is a view corresponding to FIG. 5 according to Modification 1.

In Modification 1 illustrated in FIG. 12, the outer-edge main-body-side arc portion (68) that is the fourth arc portion is not provided at the outer edge of the main body (65) of the valve holder (63). Thus, the entire front surface of the main body (65) is formed in a flat shape. In contrast, the outer-edge rear-side arc portion (83) that is the second arc portion as in the above-described embodiment is formed at the valve body (80). Thus, in Modification 1, the outer-edge rear-side arc portion (83) can ensure the rear-side first non-contact region (A4).

Modification 2

Figure 13:
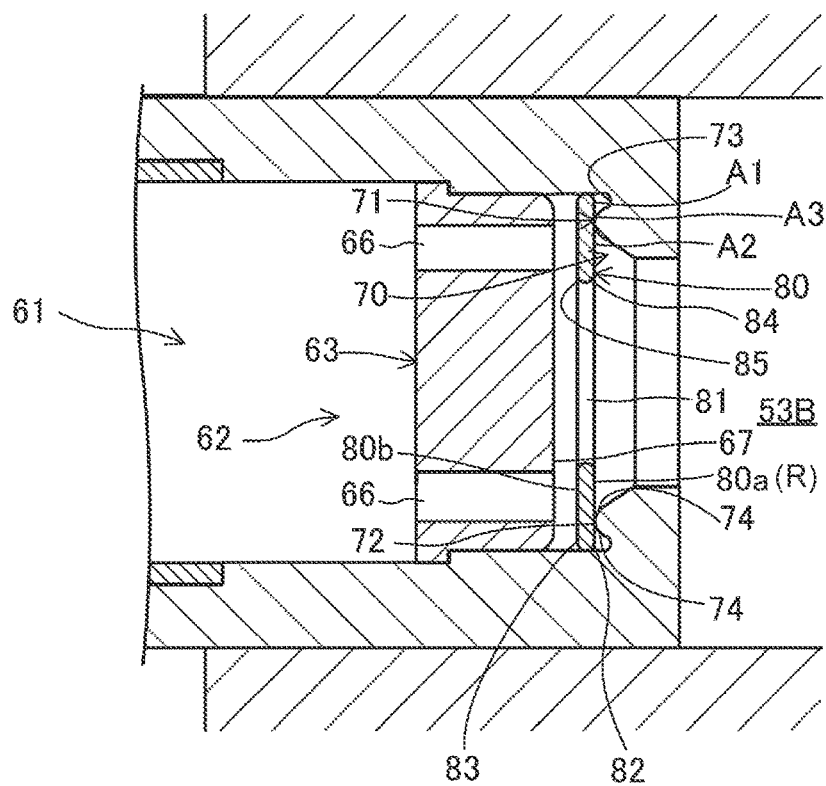
FIG. 13 is a view corresponding to FIG. 5 according to Modification 2.

In Modification 2 illustrated in FIG. 13, a second-protrusion-side arc portion (74) that is a first arc portion is formed at an outer edge and an inner edge of the second protrusion (71) of the valve seat portion (70). The second-protrusion-side arc portion (74) is formed in an arc shape in an axial sectional view.

In Modification 2, when the valve body (80) collides with the second protrusion (71) and the outer-edge-side portion of the valve body (80) is deformed, it is possible to suppress uneven contact between this portion and the outer edge of the second protrusion (71). Similarly, when the valve body (80) collides with the second protrusion (71) and the inner-peripheral-side portion of the valve body (80) is deformed, it is possible to suppress uneven contact between this portion and the inner edge of the second protrusion (71). Thus, stress concentration on the valve body (80) at the second position can be further suppressed.

The second-protrusion-side arc portion (74) may be formed only at the outer edge of the second protrusion (71). The second-protrusion-side arc portion (74) may be formed only at the inner edge of the second protrusion (71).

Modification 3

Figure 14:
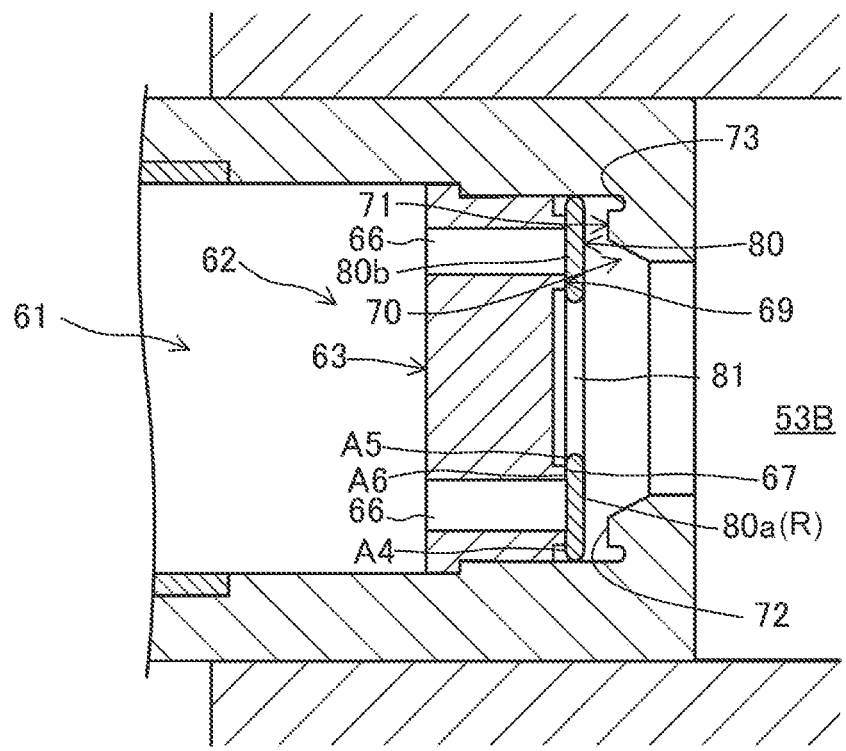
FIG. 14 is a view corresponding to FIG. 5 according to Modification 3.

In modification 3 illustrated in FIG. 14, a first protrusion (69) is formed on the front surface of the main body (65) of the valve holder (63). The first protrusion (69) is formed in a circular annular shape. The first protrusion (69) faces an intermediate portion between the outer edge and an inner edge of the rear surface (80b) of the valve body (80). A first valve seat (67) is formed at a distal end of the first protrusion (69). In the first valve seat (67), the first protrusion (69) is located at a position corresponding to the rear-side contact region (A6) of the rear surface (80b) of the valve body (80).

When the valve body (80) moves to the first position illustrated in FIG. 14, the valve body (80) comes into contact with the first valve seat (67) of the first protrusion (69). In this state, a gap is formed between the outer edge of the valve body (80) and the valve holder (63). With this gap, the rear-side first non-contact region (A4) is formed on the rear surface (80b) of the valve body (80).

In this state, a gap is formed between the inner edge (the edge of the hole (81)) of the valve body (80) and the valve holder (63). With this gap, the rear-side second non-contact region (A5) is formed on the rear surface (80*b*) of the valve body (80).

The annular contact region (A3. A6) is formed between the rear-side first non-contact region (A4) and the rear-side second non-contact region (A5).

In Modification 3, by forming the first protrusion (69) on the valve holder (63) as described above, the rear-side first non-contact region (A4) and the rear-side second non-contact region (A5) can be easily formed. When the valve body (80) collides with the first protrusion (69), portions of the valve body (80) corresponding to these non-contact regions (A4, A5) are deformed. Thus, stress concentration on the valve body (80) can be dispersed, and breakage of the valve body (80) can be suppressed.

Modification 4

Figure 15:
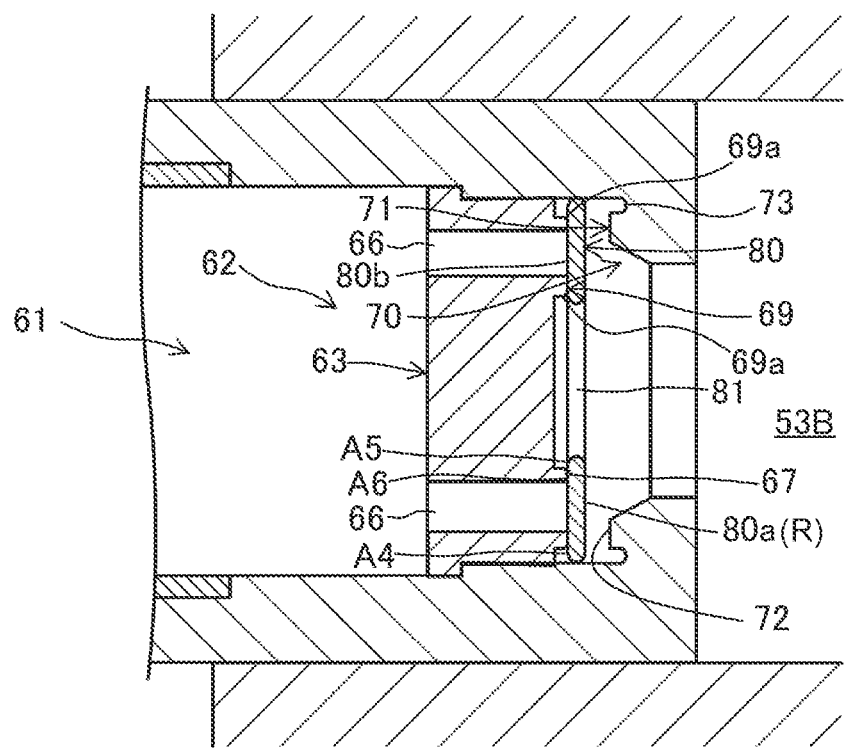
FIG. 15 is a view corresponding to FIG. 5 according to Modification 4.

In Modification 4 illustrated in FIG. 15, the first protrusion (69) is provided at the valve holder (63) as in Modification 3. At the first protrusion (69) of Modification 4, a first-protrusion-side arc portion (69*a*) that is a fifth arc portion is formed at an outer edge and an inner edge thereof. The first-protrusion-side arc portion (69*a*) is formed in an arc shape in an axial sectional view.

In Modification 4, when the valve body (80) collides with the first protrusion (69) and the outer-edge-side portion of the valve body (80) is deformed, it is possible to suppress uneven contact between this portion and the outer edge of the first protrusion (69). Similarly, when the valve body (80) collides with the first protrusion (69) and the inner-peripheral-side portion of the valve body (80) is deformed, it is possible to suppress uneven contact between this portion and an inner edge of the first protrusion (69). Thus, stress concentration on the valve body (80) at the first position can be further suppressed.

The first-protrusion-side arc portion (69*a*) may be formed only at the outer edge of the first protrusion (69). The first-protrusion-side arc portion (69*a*) may be formed only at the inner edge of the first protrusion (69).

Modification 5

Figure 16:
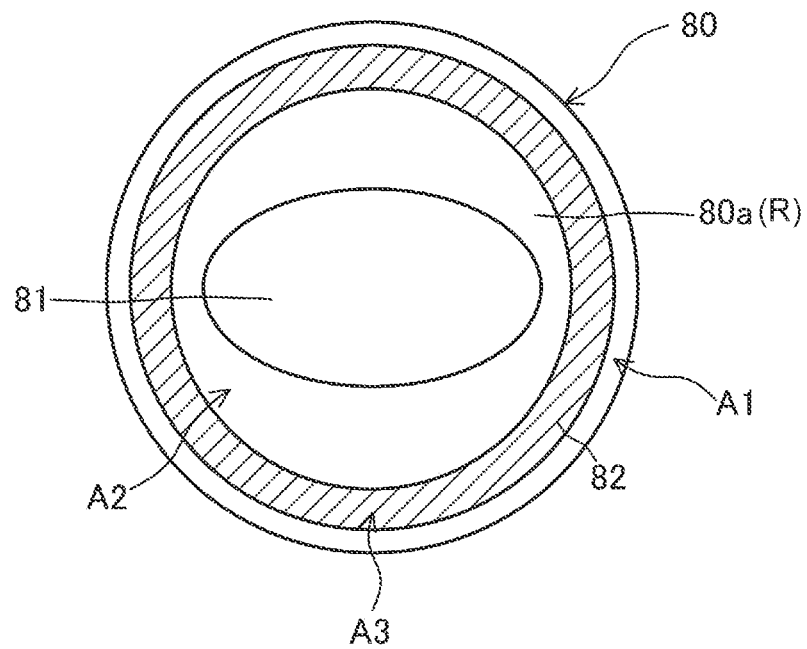
FIG. 16 is a view corresponding to FIG. 10 according to Modification 5.

In Modification 5, the shape of the valve body (80) differs from that of the above-described embodiment. As illustrated in FIG. 16 (a front view of the valve body (80)), one elliptical hole (81) is formed in the valve body (80). The center of the outer edge of the valve body (80) coincides with the center of the hole (81). In Modification 5, a portion of the front surface (80*a*) of the valve body (80) that comes into contact with the second valve seat (72) of the second protrusion (71) constitutes the front-side contact region (A3). The front-side first non-contact region (A1) is formed between the outer edge of the valve body (80) and the front-side contact region (A3). The front-side second non-contact region (A2) is formed between the hole (81) of the valve body (80) and the front-side contact region (A3).

Modification 6

Figure 17:
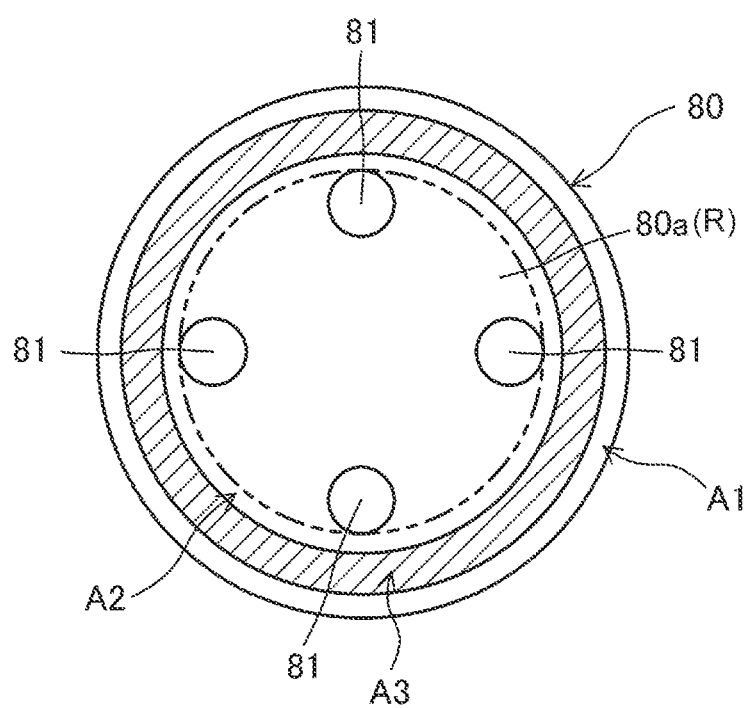
FIG. 17 is a view corresponding to FIG. 10 according to Modification 6.

In Modification 6, the shape of the valve body (80) differs from that of the above-described embodiment. As illustrated in FIG. 17 (a front view of the valve body (80)), four holes (81) are formed in the valve body (80). The four holes (81) each are formed in a circular shape. The four holes (81) are circumferentially arranged at equal pitches. The number of holes (81) is not limited to this, and may be two, three, or five or more.

In Modification 6, a portion of the front surface (80*a*) of the valve body (80) that comes into contact with the second valve seat (72) of the second protrusion (71) constitutes the front-side contact region (A3). The front-side first non-contact region (A1) is formed between the outer edge of the valve body (80) and the front-side contact region (A3). The front-side second non-contact region (A2) is formed between the front-side contact region (A3) and an imaginary circle (a circle indicated by a two-dot chain line in FIG. 17) including outermost peripheral portions of the four holes (81) of the valve body (80).

Modification 7

Figure 18:
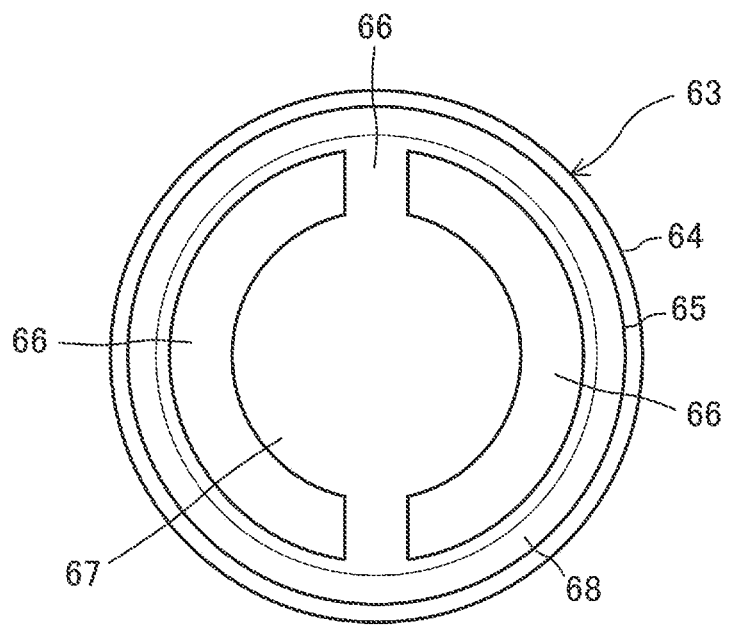
FIG. 18 is a view corresponding to FIG. 6 according to Modification 7.

As illustrated in FIG. 18, Modification 7 differs from the above-described embodiment in the shape of the communication path (66) of the valve holder (63). Two communication paths (66) are formed in the valve holder (63) of Modification 7. The shape of each communication path (66) in a sectional view perpendicular to its axis is formed in an arc shape centered on the axis of the valve holder (63).

Modification 8

Figure 19:
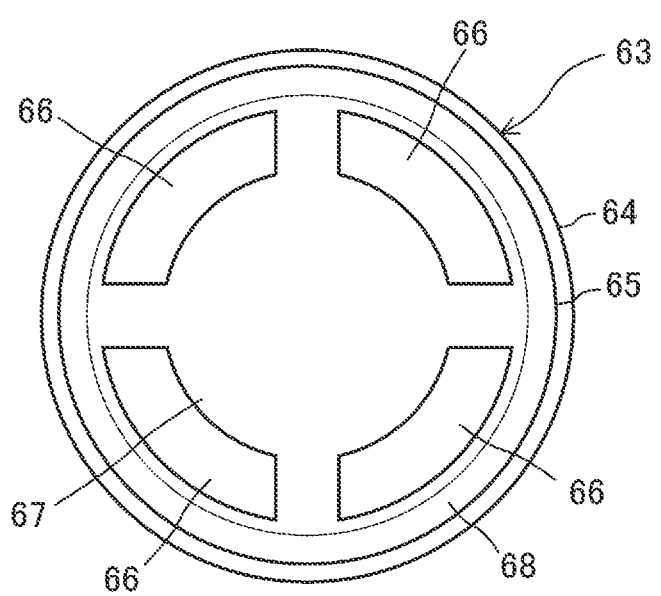
FIG. 19 is a view corresponding to FIG. 6 according to Modification 8.

As illustrated in FIG. 19, in Modification 8, four communication paths (66) are formed in the valve holder (63). The shape of each communication path (66) in a sectional view perpendicular to its axis is formed in an arc shape centered on the axis of the valve holder (63). The number of the communication paths (66) may be one, three, or five or more.

OTHER EMBODIMENTS

The above-described embodiment and modifications may have the following configurations.

The compression mechanism (50) of the compressor (40) of the above-described embodiment is of a swing piston type. However, the compression mechanism (50) may be of a rolling piston type. In this compression mechanism (50), the compression chamber (53B) is partitioned by a vane separated from the piston (52) instead of the blade of the embodiment. The compression mechanism (50) may be of another type such as a scroll type.

The intermediate-pressure refrigerant that has flowed through the second flow path (26B) of the subcooling heat exchanger (26) is introduced into the introduction path (61) of the compressor (40) of the above-described embodiment. However, for example, the intermediate-pressure gas refrigerant separated by a gas-liquid separator of the refrigerant circuit (11) may be introduced into the introduction path (61).

Although the embodiments and the modifications have been described above, it will be understood that various changes in embodiments and details may be made without departing from the idea and scope of the claims. The above-described embodiment, modifications, and other embodiments may be appropriately combined or replaced as long as the target functions of the present disclosure are not impaired. The wordings of "first", "second", "third", and so forth described above are used to distinguish the terms to which these wordings are given, and do not limit the number or order of the terms.

As described above, the present disclosure is useful for a rotary compressor.

The invention claimed is:
1. A rotary compressor comprising:
a drive mechanism;
a compression mechanism configured to be rotationally driven by the drive mechanism;
an introduction path configured to introduce a fluid into a compression chamber of the compression mechanism; and a backflow suppression mechanism configured to suppress a backflow of the fluid in the introduction path, the backflow suppression mechanism including
  a first valve receiving portion disposed in the introduction path,
  a second valve receiving portion disposed on a downstream side of the first valve receiving portion in the introduction path, and
  a valve body disposed between the first valve receiving portion and the second valve receiving portion,
the first valve receiving portion partitioning the introduction path into an inflow-side flow path and an outflow-side flow path, and the first valve receiving portion having
  a communication path that allows the two flow paths to communicate with each other and
  a first valve seat facing a first surface of the valve body,
the second valve receiving portion having a second valve seat facing a second surface of the valve body,
the valve body having a pressure receiving portion on which a pressure of the compression chamber acts,
the backflow suppression mechanism being configured to reciprocate, in accordance with a change in the pressure of the compression chamber, between
  a first position at which the valve body is in contact with the first valve seat and closes the communication path, and
  a second position at which the valve body is in contact with the second valve seat and opens the communication path,
the valve body having a circular annular shape and having a hole that is a single circular hole formed in a central portion of the valve body, the fluid supplied to the compression chamber when the valve body is at the second position passing through the hole, and
at least one of the first surface and the second surface of the valve body including
  an annular first non-contact region that is formed in a predetermined range extending radially inward from an outer edge of the valve body and that does not come into contact with a corresponding valve seat,
  an annular second non-contact region that is formed in a predetermined range extending radially outward from the hole of the valve body and that does not come into contact with a corresponding valve seat, and
  a contact region that is formed between the first non-contact region and the second non-contact region and that comes into contact with a corresponding valve seat,
the valve body being configured such that when d is a radial length from the outer edge of the valve body to the hole, the contact region is formed in a range located radially inward at least (¼)×d from the outer edge of the valve body and radially outward at least (¼)×d from the hole.

2. The rotary compressor according to claim 1, wherein
the second valve receiving portion has a second protrusion protruding toward the second surface of the valve body,
the second valve seat is formed at a distal end of the second protrusion, and
the second non-contact region of the second surface of the valve body forms the pressure receiving portion.

3. The rotary compressor according to claim 2, wherein
a first arc portion having an arc shape in an axial sectional view is formed at at least one of an outer edge and an inner edge of the second protrusion.

4. The rotary compressor according to claim 2, wherein
the compression mechanism is configured to compress a refrigerant as the fluid containing a refrigeration oil, and
an annular groove is formed between the second protrusion and an inner peripheral surface of the introduction path.

5. The rotary compressor according to claim 1, wherein
the contact region is formed in a range located
  radially inward at least (⅓)×d from the outer edge of the valve body and
  radially outward at least (⅓)×d from the hole.

6. The rotary compressor according to claim 1, wherein
a second arc portion is formed in an arc shape in an axial sectional view and forms the first non-contact region, and the second arc portion is provided at an outer edge of at least one of the first surface and the second surface of the valve body.

7. The rotary compressor according to claim 1, wherein
a third arc portion is formed in an arc shape in an axial sectional view and forms the second non-contact region, and the third arc portion is provided at an edge of the hole in at least one of the first surface and the second surface of the valve body.

8. The rotary compressor according to claim 1, wherein
a fourth arc portion is formed in an arc shape in an axial sectional view to form the first non-contact region, and the fourth arc portion is provided at an outer edge of the first valve receiving portion.

9. The rotary compressor according to claim 1, wherein
a first protrusion protrudes toward the first surface of the valve body and forms the contact region by coming into contact with the first surface, and the first protrusion is formed at the first valve seat.

10. The rotary compressor according to claim 9, wherein
a fifth arc portion having an arc shape in an axial sectional view is formed at at least one of an outer edge and an inner edge of the first protrusion.

11. The rotary compressor according to claim 1, wherein
the compression mechanism includes a rolling piston or a swing piston.

* * * * *